United States Patent
Oi et al.

(10) Patent No.: US 6,451,946 B1
(45) Date of Patent: Sep. 17, 2002

(54) COPOLYMER, PROCESS FOR THE PRODUCTION THEREOF, AND MOLDED ARTICLE THEREOF

(75) Inventors: Nobuo Oi, Narashino; Yasuro Suzuki, Kisarazu; Tatsuya Miyatake, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/457,360

(22) Filed: Dec. 9, 1999

(30) Foreign Application Priority Data

Dec. 11, 1998 (JP) ............................. 10-353105

(51) Int. Cl.$^7$ ........................... C08F 212/08; C08F 4/44
(52) U.S. Cl. .................. 526/282; 526/347; 526/160; 526/161; 526/916; 526/948; 526/348.6; 502/155
(58) Field of Search ................ 526/282, 281, 526/308, 347, 347.1, 384, 943, 161, 348.6, 916, 160; 502/152

(56) References Cited

U.S. PATENT DOCUMENTS

| 5,721,185 A | 2/1998 | Lapointe et al. ............ 502/117 |
| 6,063,886 A * | 5/2000 | Yamaguchi et al. ......... 526/282 |
| 6,107,374 A * | 8/2000 | Stevens et al. ............... 524/60 |

FOREIGN PATENT DOCUMENTS

| EP | 872506 A1 | 10/1988 |
| EP | 416815 A2 | 3/1991 |
| EP | 678530 A1 | 10/1995 |
| EP | 764653 A2 | 3/1997 |
| EP | 764664 A2 | 3/1997 |
| JP | 2173112 A | 7/1990 |
| JP | 5194641 A | 8/1993 |
| JP | 9183809 A | 7/1997 |

OTHER PUBLICATIONS

Sernetz et al., Metallocene–Catalyzed Ethene/styrene Co– and Terpolymerization with Olefinic Termonomers, Journal of Polymer Science, vol. 35, 1997, pp. 2549–2560.*

Goto et al., Chemical Abstracts, vol. 120, No. 14 (1994) XP–002157847, Abstract only.

Sernetz, Friedrich G. et al., Journal of Polymer Science, vol. 35, 1997, pp. 2549–2560.

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

A copolymer of (a) ethylene and/or an α-olefin, (b) a cyclic olefin and (c) an alkenyl aromatic hydrocarbon, having acyclic olefin content of 0.01 to 66 mol % and a styrene content of 3 to 99 mol %, wherein the styrene content is more than a half of the cyclic olefin content, a process for producing the copolymer with a specific catalyst and a molded article made from the copolymer. The copolymer and molded article thereof are transparent, and excellent in flexibility and heat resistance.

27 Claims, 4 Drawing Sheets

COPOLYMER, PROCESS FOR THE PRODUCTION THEREOF, AND MOLDED ARTICLE THEREOF

BACKGROUND OF THE INVENTION

1. Field of the Invention

The present invention relates to a copolymer suitable for a film, a sheet or a pipe, a process for the production thereof, and a molded article thereof. More specifically, the present invention relates to a copolymer suitable for a substitute article of a polyvinyl chloride (for example, a film, a sheet or a pipe), a process for production thereof, and a molded article thereof.

2. Description of the Related Art

In general, an elastic recoverability, transparency and mechanical strength found in a polyvinyl chloride are required for a copolymer to be used as various films such as, for example, wrapping film. However, the polyvinyl chloride comes in question concerning environmental pollution because of the possibility of generation of harmful substances at incineration, etc. Various kind of polymers are presently considered as a replacement for the polyvinyl chloride, but it is the status quo that none of them have been obtained satisfactory from the viewpoints of viscoelastic properties and transparency.

In recent years, progress has occurred in the field of polymerization of olefins such as ethylene or propylene. Particularly, a polymer having characteristics different from conventional polymers can be produced and an extremely small amount of catalyst can produce a large amount of polymer, because of the use of a catalyst using a transition metal compound such as a so-called metallocene, a non-metallocene or the like.

An application of such a catalyst to the copolymerization of ethylene with an alkenyl aromatic hydrocarbon represented by styrene has been proposed. For example, a pseudo-random copolymer (a random copolymer wherein methine carbon atoms with which a phenyl group is bonded are mutually separated by 2 or more of methylene groups without fail) of ethylene with styrene obtained by using a so-called homogeneous Ziegler-Natta catalyst using a specific transition metal compound and an organoaluminum compound is described in Japanese Patent Publication No. 2623070. Said copolymer is excellent in viscoelastic properties and transparency, and is expected as a replacement for polyvinyl chloride. However, there have been problems in that it has low oil resistance and insufficient heat resistance. Further, the copolymer obtained by said production process happens to have a deterioration of transparency because of the formation of a syndiotactic polystyrene as a by-product.

The application of such metallocene catalysts to the copolymerization of ethylene with a cyclic olefin represented by norbornene has been proposed. For example, a process for copolymerizing norbornene with ethylene using isopropylidene (cyclopentadienyl)(fluorenyl)titanium dichloride in Japanese Patent Publication (Kokai) No. 02-173112 or (tert-butylamido)dimethyl (tetramethylcyclopentadienyl) silanetitanium dichloride in Japanese Patent Publication (Kokai) No. 05-194641 as a catalyst component is disclosed. The copolymers obtained by these processes have high oil resistance and are useful as a heat resistant resin because of an extremely high glass transition temperature, but is inferior in flexibility to a copolymer of ethylene with styrene. The present invention was performed under the above-mentioned circumstances.

SUMMARY OF THE INVENTION

An object of the present invention is to provide a transparent copolymer excellent in flexibility and heat resistance and that's constitution does not containing a halogen, so as to not be questioned from the viewpoint of environmental pollution.

Another object of the present invention is to provide a process for producing said copolymer at an extremely high polymerization activity, and a molded article of said copolymer.

Other objects of the present invention will be apparent from the following description.

In order to attain the above-mentioned objects, the present inventors have extensively studied the production of a copolymer based on a process for production using a transition metal compound represented by a metallocene as a catalyst component, and have thereby completed the present invention.

The present invention relates to a copolymer of (a) ethylene and/or an α-olefin and (b) a cyclic olefin with (c) an alkenyl aromatic hydrocarbon, wherein the content of said cyclic olefin is 0.01 to 66 mol %, the content of said alkenyl aromatic hydrocarbon is 3 to 99 mol%, and the content of the alkenyl aromatic hydrocarbon is more than a half of the content of the cyclic olefin (and the sum of ethylene and/or the α-olefin, the cyclic olefin and the alkenyl aromatic hydrocarbon is 100 mol %).

Further, the present invention relates to a process for producing said copolymer which comprises copolymerizing ethylene and/or an α-olefin and a cyclic olefin with an alkenyl aromatic hydrocarbon in the presence of a catalyst prepared from (A) and [(B) and/or (C)] described below; and a molded article of said copolymer.

(A): a transition metal complex represented by the following general formula [I], [II] or [III]:

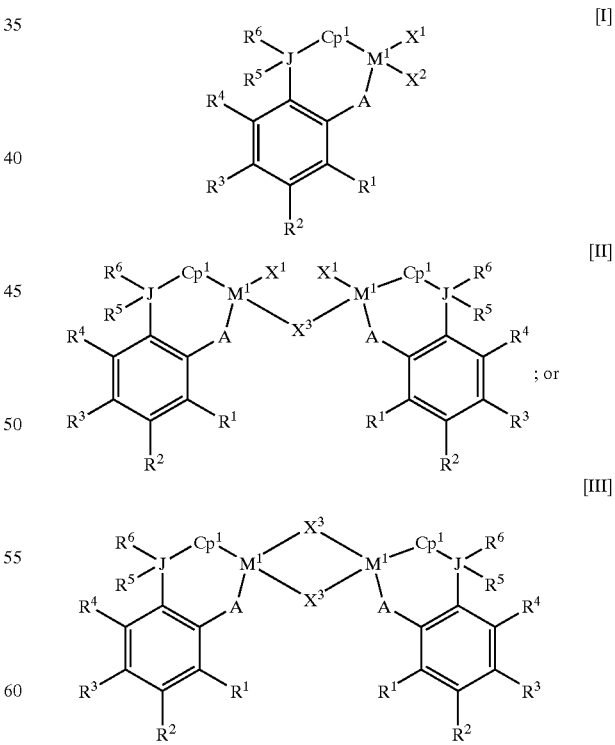

(wherein $M^1$ indicates a transition metal atom of the Group IV of the Periodic Table of the Elements; A indicates an atom of the Group XVI of the Periodic Table of the Elements; J indicates an atom of the Group XIV of the Periodic Table of the Elements; $Cp^1$ indicates a group having a cyclopentadiene type anion skeleton; each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group; $X^1$ indicates an atom of Group XVI of the Periodic Table of the Elements; $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different.), (B): one or more aluminum compounds selected from the following (B1) to (B3);

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^1$ may be the same or different; Z represents a hydrogen atom or a halogen atom, and all of Z may be the same or different; "a" represents a number satisfying the expression $0<a\leq 3$; "b" represents an integer of 2 or more and "c" represents an integer of 1 or more); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L—H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L—H)^+$ represents a Brønsted acid).

DETAILED DESCRIPTION OF THE INVENTION

Figure 1:
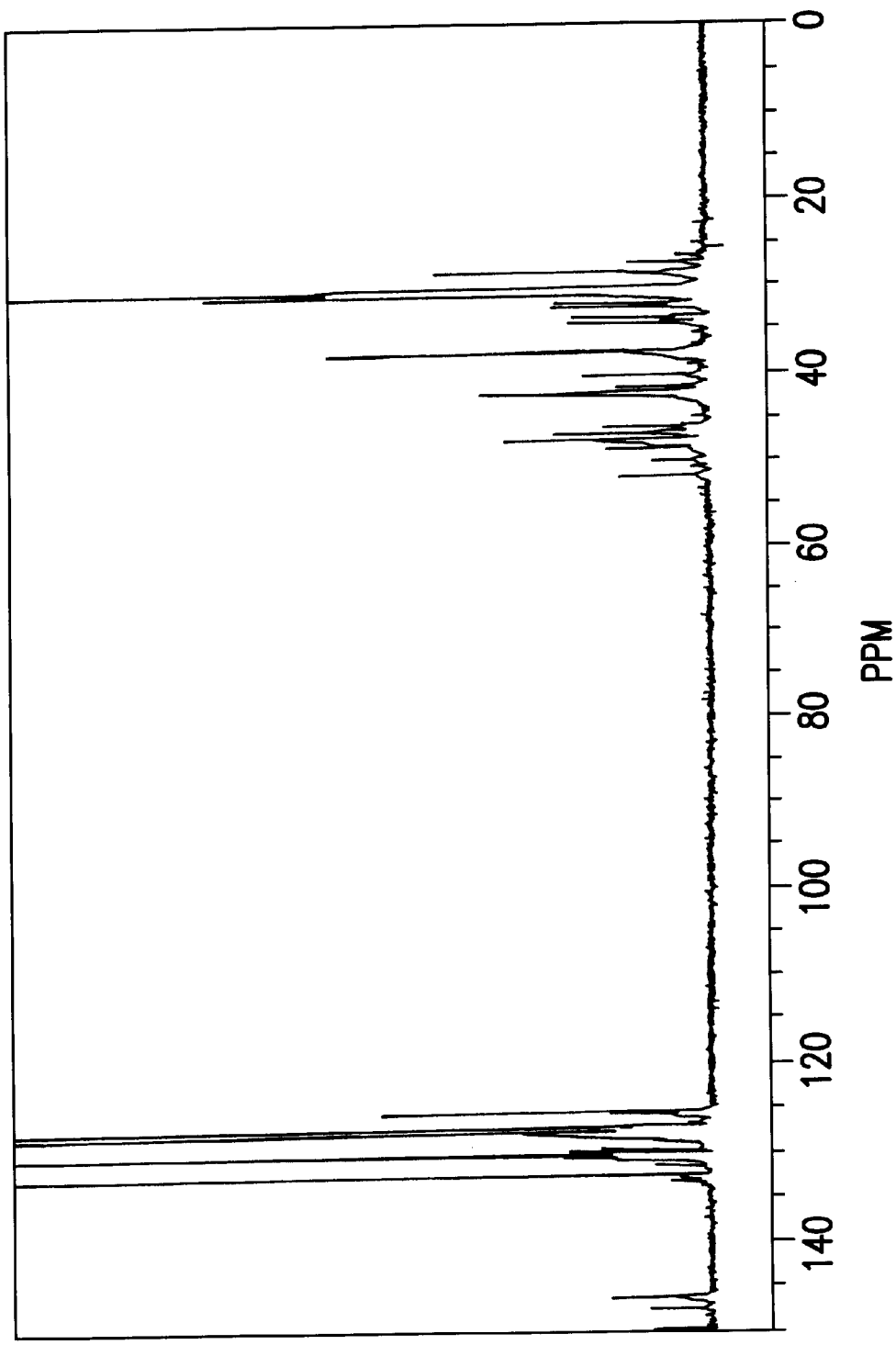
FIG. 1 shows a $^{13}$C-NMR spectrum of the copolymer obtained in Example 1.

The present invention is further illustrated in detail below.

The copolymer of the present invention is a copolymer of ethylene and/or an α-olefin and a cyclic olefin with an alkenyl aromatic hydrocarbon, wherein the cyclic olefin content is 0.01 to 66 mol %, the alkenyl aromatic hydrocarbon content is 3 to 99 mol %, and the alkenyl aromatic hydrocarbon content is more than a half of the cyclic olefin content (provided that the total content of ethylene and/or the α-olefin, the cyclic olefin and the alkenyl aromatic hydrocarbon is 100 mol %).

The ethylene and/or the α-olefin used in the present invention is either ethylene, an α-olefin or a mixture of ethylene and an α-olefin, and ethylene is preferred.

The α-olefin is preferably an α-olefin having 3 to 20 carbon atoms, and specific examples of such an α-olefin include linear olefins such as propylene, 1-butene, 1-pentene, 1-hexene, 1-heptene, 1-octene, 1-nonene, 1-decene and the like, branched olefins such as 3-methyl-1-butene, 3-methyl-1-pentene, 4-methyl-1-pentene, 5-methyl-1-hexene and the like, vinylcyclohexane and the like. Among these, propylene, 1-butene, 1-pentene, 1-hexene, 1-heptene, 1-octene, 4-methyl-1-pentene, or vinylcyclohexane are more preferable, and propylene is particularly preferable.

In the present invention, the α-olefin is used alone or in a mixture of two or more α-olefins.

The cyclic olefin used in the present invention is a compound in which 4 or more of carbon atoms which may optionally have a substituent group, form a ring and one carbon-carbon double bond is contained in said ring. As such cyclic olefins, there are illustrated mono-cyclic olefins such as cyclobutene, cyclopentene, cyclohexene, cyclooctene, 3-methylcyclopentene, 4-methylcyclopentene, 3-methylcyclohexene and the like; and poly-cyclic olefins such as 1,2-dihydrodicyclopentadiene, poly-cyclic olefins represented by the general formula [IV] described below:

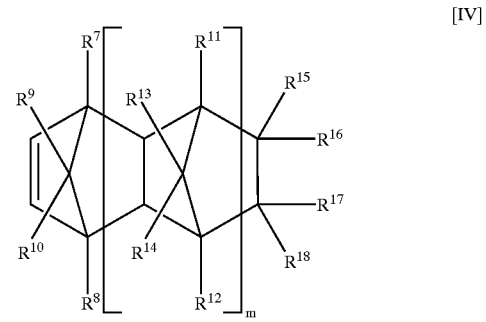

[IV]

(wherein each of $R^7$ to $R^{18}$ independently is a hydrogen atom, a hydroxyl group, an amino group, a phosphino group or an organic group having 1 to 20 carbon atoms, and $R^{16}$ and $R^{17}$ may form a ring; and "m" indicates an integer of 0 or more.)

The specific examples of the organic group having 1 to 20 carbon atoms include alkyl groups such as a methyl group, an ethyl group, a propyl group, a butyl group, a hexyl group, an octyl group, a dodecyl group and the like; aryl groups such as a phenyl group, a tolyl group, a naphthyl group and the like; aralkyl groups such as a benzyl group, a phenethyl group and the like; alkoxy groups such as a methoxy group, an ethoxy group and the like; aryloxy groups such as a phenoxy group and the like; acyl groups such as an acetyl group and the like; alkoxycarbonyl groups such as a methoxycarbonyl group, an ethoxycarbonyl group and the like; aryloxycarbonyl groups or aralkyloxycarbonyl groups; acyloxy groups such as an acetyloxy group and the like; alkoxysulfonyl groups such as a methoxysulfonyl group, an ethoxysulfonyl group and the like; aryloxysulfonyl groups or aralkyloxysulfonyl groups; substituted silyl groups such as a trimethylsilyl group and the like; dialkylamino groups such as a dimethylamino group, a diethylamino group and the like; a carboxyl group; a cyano group; and a group in which a part of hydrogen atoms of the above-mentioned alkyl group, aryl group or aralkyl group is substituted with a hydroxyl group, an amino group, an acyl group, a carboxyl group, an alkoxy group, an alkoxycarbonyl group, an acyloxy group, a substituted silyl group, an alkylamino group or a cyano group.

Each of $R^7$ to $R^{18}$ independently is preferably a hydrogen atom, an alkyl group having 1 to 20 carbon atoms, an aryl group having 6 to 20 carbon atoms, an aralkyl group having 7 to 20 carbon atoms, an acyl group having 1 to 20 carbon atoms, an alkoxycarbonyl group having 2 to 20 carbon atoms, an acyloxy group having 1 to 20 carbon atoms, or a di-substituted silyl group having 2 to 20 carbon atoms; "m" is an integer of 0 or more, and preferably an integer of $0 \leq m \leq 3$.

Among these cyclic olefins, poly-cyclic olefins represented by the general formula [IV] above are preferable.

The specific examples of the poly-cyclic olefin represented by the general formula [IV] include norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and the like. These cyclic olefins are used alone or in a mixture of two or more thereof at polymerization.

The alkenyl aromatic hydrocarbon used in the present invention is preferably a compound represented by the general formula [V] below:

[V]

(Wherein $R^{19}$ is a hydrogen atom or an alkyl group having 1 to 20 carbon atoms, and Ar indicates an aromatic hydrocarbon group having 6 to 25 carbon atoms.)

$R^{19}$ is a hydrogen atom or an alkyl group having 1 to 20 carbon atoms, and the specific examples of the alkyl group having 1 to 20 carbon atoms include a methyl group, an ethyl group, a propyl group, a butyl group, a hexyl group, an octyl group a dodecyl group and the like. A hydrogen atom or a methyl group is preferable.

Ar is an aromatic hydrocarbon group having 6 to 25 carbon atoms, and specific examples include a phenyl group, a tolyl group, a xylyl group, a tert-butylphenyl group, a vinylphenyl group, a naphthyl group, a phenanthryl group, an anthrathenyl group, a benzyl group and the like. A phenyl group, a tolyl group, a xylyl group, a tert-butylphenyl group, a vinylphenyl group or a naphthyl group is preferable.

Specific examples of such alkenyl aromatic hydrocarbon include alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylatyrene, 3,4-dimethylstyrene, 3,5-dimethylstyrene, 3-methyl-5-ethylstyrene, p-tert-butylstyrene, p-sec-butylstyrene and the like; alkenylbenzenes such as styrene, 2-phenylpropylene, 2-phenylbutene, 3-phenylpropylene and the like; alkenylnaphthalenes such as 1-vinylnaphthalene and the like, etc. The alkenyl aromatic hydrocarbon used in the present invention is preferably styrene, p-methylstyrene, m-methylstyrene, o-methylstyrene, p-tert-butylstyrene, 2-phenylpropylene, or 1-vinylnaphthalene, and styrene is preferable in particular.

The copolymer of the present invention may contain other vinyl compound unit(s) in addition to the above-mentioned compound, so far as the object of the present invention is not damaged. The copolymer can be obtained by copolymerizing other vinyl compound(s) in addition to the above-mentioned compound at polymerization. Specific examples of such other vinyl compound(s) include methyl vinyl ether, ethyl vinyl ether, acrylic acid, methyl acrylate, ethyl acrylate, methyl methacrylate, acrylonitrile, vinyl acetate and the like.

The cyclic olefin content is 0.01 to 66 mol % in the copolymer of the present invention. When the cyclic olefin content is within the range, the copolymer is excellent in heat resistance in particular and further in oil resistance. The cyclic olefin content is more preferably 0.1 to 40 mol % and the cyclic olefin content is preferably 1 to 30 mol % in particular. The cyclic olefin content is easily determined by a $^1$H-NMR measurement or a $^{13}$C-NMR measurement.

The alkenyl aromatic hydrocarbon content is 3 to 99 mol % in the copolymer of the present invention. When the alkenyl aromatic hydrocarbon content is within the range, the copolymer is excellent in heat resistance and flexibility in particular, and its refractive index is high, which is preferable. The alkenyl aromatic hydrocarbon content is more preferably 3 to 55 mol % and the alkenyl aromatic hydrocarbon content is preferably 5 to 45 mol % in particular. The alkenyl aromatic hydrocarbon content is easily determined by a $^1$H-NMR measurement and a $^{13}$C-NMR measurement.

Further, in the copolymer of the present invention, the alkenyl aromatic hydrocarbon content is more than a half of the content of the cyclic olefin. When the content is within the range, the copolymer is excellent in its balance between heat resistance and elastic recoverability. When the alkenyl aromatic hydrocarbon content is a half or less of the content of the cyclic olefin, the elastic recoverability sometimes lowers.

The alkenyl aromatic hydrocarbon content of the copolymer of the present invention is preferably not less than the cyclic olefin content.

The copolymer of the present invention is preferably an amorphous copolymer having no crystallinity, from the viewpoint of transparency. It can be confirmed by no substantial indication of a melting point in a fusion curve measured by a differential scanning calorimeter (DSC), that the copolymer has no crystallinity.

It is preferable in the copolymer of the present invention that the sum of the content of the alkenyl aromatic hydrocarbon and the content of the cyclic olefin is 10 mol % or more. When the sum of the contents is within the above range, the copolymer becomes amorphous and is excellent in transparency.

The copolymer of the present invention has a glass transition point (Tg) of –20 to 170° C. The copolymer has preferably a Tg of –20 to 140° C., more preferably a Tg of 30 to 100° C. In particular, a copolymer having a Tg of 35° C. or more and less than 60° C. is preferable. The Tg can be measured by a differential scanning calorimeter (DSC).

Further, the copolymer of the present invention can give a copolymer having a comparatively high refractive index, and, therefore, the copolymer is not relatively damaged in transparency by addition of a filler for improving the rigidity. Moreover, a stretched film prepared from the copolymer of the present invention has a relatively high shrinkage ratio.

The copolymer of the present invention can be produced at high polymerization activity, for example, by copolymerizingethylene and/or the α-olefin and the cyclic olefin with the alkenyl aromatic hydrocarbon in the presence of a catalyst prepared from (A) and [(B) and/or (C)] described below:

(A): a transition metal complex represented by the following general formula [I], [II] or [III]:

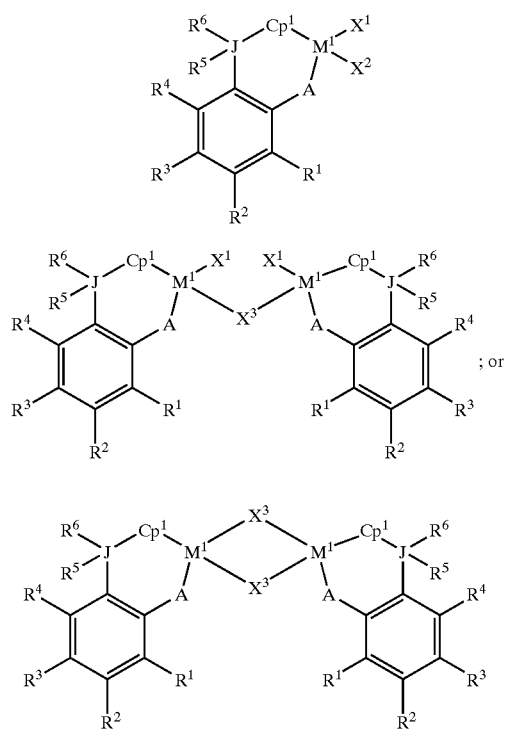

(wherein $M^1$ indicates a transition metal atom of the Group IV of the Periodic Table of the Elements; A indicates an atom of the Group XVI of the Periodic Table of the Elements; J indicates an atom of the Group XIV of the Periodic Table of the Elements; $Cp^1$ indicates a group having a cyclopentadiene type anion skeleton; each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group; $X^3$ indicates an atom of Group XVI of the Periodic Table of the Elements; $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different.), (B): one or more aluminum compounds selected from the following (B1) to (B3);

(B1) an organoaluminum compound represented by the general formula $E^1_a Alz_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3_2$ (wherein $E^1$, $E^2$ and $E^3$ respectively represent a hydrocarbon group, all of $E^1$, all of $E^2$ and all of $E^3$ may be the same or different; z represents a hydrogen atom or a halogen atom, and all of Z may be the same or different; "a" represents a number satisfying the expression $0<a\leq 3$; "b" represents an integer of 2 or more and "c" represents an integer of 1 or more); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^-$ represents a Brønsted acid).

The production of the copolymer above is described in detail below.

(A) Transition Metal Complex

In the general formula [I], [II] or [III], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, a titanium atom or zirconium atom is preferred.

Examples of an atom of the XVI Group indicated as A in the general formula [I], [II] or [III], include an oxygen atom, sulfur atom, selenium atom and the like. Among them, an oxygen atom is preferred.

Examples of an atom of the XIV Group indicated as J in the general formula [I], [II] or [III], include a carbon atom, silicon atom, germanium atom and the like, a carbon atom and silicon atom are preferred, and a carbon atom is particularly preferred.

The group having a cyclopentadiene anion skeleton, as for the substituent $Cp^1$, includes $\eta^3$-(substituted)cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as phenyl group. Examples of the substituted silyl group having 1 to 20 carbon atoms include mono-substituted silyl groups having 1 to 20 carbon atoms, such as methylsilyl group, ethylsilyl group, phenylsilyl group, etc.; di-substituted silyl groups having 2 to 20 carbon atoms, such as dimethylsilyl group, diethylsilyl group, diphenylsilyl group, etc.; and tri-substituted silyl groups having 3 to 20 carbon atoms, such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trisethylphenyl)methoxy group, (2,3,5-trimethylphenyl)methoxy group, (2,3,6-trimethylphenyl)ethoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetraimethylphenyl)methoxy group, (pentamethylphenyl)methoxy group, (ethylphenyl)methoxy group, (n-propylphenyl)ethoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group, etc., more preferably benzyloxy group.

All of these aralkyloxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., an aryl group having 6 to 10 carbon atoms, such as phenyl group, etc., and an aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$ may be optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the atom of Group XVI of the Periodic Table of the Elements indicated as $X^3$ in the general formula [II] or [III] include an oxygen atom, a sulfur atom, a selenium atom and the like, and an oxygen atom is preferable.

Examples of the transition metal complex (A) represented by the formula [I] (hereinafter referred to as a "transition metal complex A", sometimes) include transition metal complexes wherein J is a carbon atom in the general formula [I], such as methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2- phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl) (3-trimethylsilyl-5-methyl-2-phenoxy) titanium dichloride, methylene(trimethylsilylcyclopentadienyl)(3-tert-butyl-5-methoxy-2-phenoxy)titanium dichloride, methylene trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)( 3-tert-butyl-5-methyl-2-phenoxy)titanium dichloride, isopropylidene(trimethylsilylcyclopentadienyl)(3-phenyl-2-phenoxy)

titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl) (3-trimethylsilyl-5-methyl-2-phenoxy)titaniumdichloride, diphenylmethylene(methylcyclopentadienyl)( 3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)( 3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylrnethylene(trimethylsilylcyclopentadienyl)(3-tert-butyl-5-methoxy-2-phenoxy)titanium dichloride, diphenylmethylenetrimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl- 2-phenoxy)titanium dichloride, diphenylmethylene(fluorenyl)(3-tert-butyl-5-methyl-2-phenoxy)titaniurn dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy) (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complex wherein J is an atom of Group XIV of the Periodic Table of the Elements other than carbon atom, such as dimethylsilylene (cyclopentadienyl)(2-phenoxy)titanium dichloride, dimethylsilylene(cyclopentadienyl)(3-methyl-2-phenoxy) titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-di-sec-amyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)( 3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-di-sec-amyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-di-sec-amyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)itanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene (tert-butylcyclopentadienyl)(3-tert-butyl-5-chloro-2-phenoxy)titanium dichloride, dimethylsilylene(tert-butylcyclopentadienyl)(3,5-di-sec-amyl-2-phenoxy)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)( 5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-di-sec-amyl-2-phenoxy)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilyiene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-di-sec-amyl-2-phenoxy)titanium dichloride, dimethylsilylene(indenyl)(2-phenoxy)titaniumdichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy)titanium dichloride, dimethylsilylene(fluorenyl)(2-phenoxy) titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-di-sec-amyl-2-phenoxy) titanium dichloride, and dimethylsilylene (tetramethylcyclopentadienyl)(1-naphthox-2-yl)titanium dichloride; compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl); compounds wherein (2-phenoxy) of these compounds is replaced by (3-phenyl-2-phenoxy), (3-trimethylsilyl-2-phenoxy) or (3-tert-butyldimethylsilyl-2-phenoxy); compounds wherein dimethylsilylene of these compounds is replaced by diethylsilylene, diphenylsilylene or dimethoxysilylene, compounds wherein titanium of these compounds is replaced by zirconium or hafnium; and compounds wherein dichloride of these compounds is replaced by dibromide, diiodide, bis(dimethylamide), bis (diethylamide), di-n-butoxide or diisopropoxide.

The transition metal complex represented by the above general formula [I] can be synthesized, for example, by a method disclosed in WO 97/03992.

The transition metal compound represented by the general formula [II] or [III] can be produced, for example, by reacting a transition metal compound represented by the general formula [I] with 0.5-fold by mole or 1-fold by mole of water. Wherein a method of directly reacting a transition metal compound with a required amount of water, a method of charging a transition metal compound in a solvent such as a hydrocarbon containing a required amount of water, or the like, a method of charging a transition metal compound represented by the general formula [I] in a solvent such as a dry hydrocarbon or the like and further flowing an inert gas containing a required amount of water, or the like, etc. can be adopted.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1_a AlZ_{3-a}$;

(B2) a cyclic aluminoxane having a structure represented by the general formula $\{-Al(E^2)-O-\}_b$; and (B3) a linear aluminoxane having a structure represented by the general formula $E^3\{-Al(E^3)-O-\}_c AlE^3_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0<a\leq 3$; "b" represents an integer of 2 or more and "c" represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1_a AlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminum is preferred and triethylaluminum or triisobutylaluminum is more preferred. Specific examples of $E^2$ and $E^3$ in (B2) a cyclic aluminoxane having a structure represented by the general formula $\{-Al(E^2)-O-\}_b$ and (B3) a linear aluminoxane having a structure represented by the general formula $E^3\{-Al(E^3)-O-\}_c AlE^3_2$ include alkyl group such as methyl group, ethyl group, n-propyl group, isopropyl group, n-butyl group, isobutyl group, n-pentyl group, neopentyl group, etc. "b" is an integer of 2 or more, "c" is an integer of 1 or more. Each of $E^2$ and $E^3$ is preferably a methyl group or isobutyl group. "b" is preferably from 2 to 40 and "c" is preferably from 1 to 40.

The above aluminoxane is prepared by various methods. The method is not specifically limited, and the aluminoxane may be prepared according to a publicly known method. For example, the aluminoxane can be prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^3$ are a fluorinated hydrocarbon group having 1 to 20 carbon atoms and containing at least one fluorine atom, and most preferably, $Q^1$ to $Q^3$ are a fluorinated aryl group having 6 to 20 carbon atoms and containing at least one fluorine atom.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are the same as defined above for $Q^1$ to $Q^3$ in (C1). Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^-$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combinations of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl) borate, etc., most preferably triphenylmethyltetrakis (pentafluorophenyl)borate.

In the boron compound (C3) represented by the formula (L—H)$^+$(BQ$^1$Q$^2$Q$^3$Q$^4$)$^-$, L represents a neutral Lewis base; (L—H)$^-$ represents a Brønsted acid; B represents a boron atom in the trivalent valence state; and $Q^1$ to $Q^4$ are the same as defined above for $Q^1$ to $Q^3$ (C1).

Specific examples of (L—H)$^+$ as a Brønsted acid in the compound represented by the formula (L—H)$^+$ (BQ$^1$Q$^2$Q$^3$Q$^4$)$^-$ include trialkyl-substituted ammoniums, N,N-dialkylaniliniums, dialkylammoniums, triarylphosphoniums, etc., and examples of (BQ$^1$Q$^2$Q$^3$Q$^4$)$^-$ include those as defined above.

Specific combinations of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl) borate, N,N-dimethylaniliniumtetrakis(pentafluorophenyl) borate, N,N-diethylaniliniumtetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri (methylphenyl)phosphoniumtetrakis(pentafluorophenyl) borate, tri(dimethylphenyl)phosphoniumtetrakis (pentafluorophenyl)borate, etc., most preferably tri(n-butyl) ammoniumtetrakis(pentafluorophenyl)borate or N,N-dimethylanilinumtetrakis(pentafluorophenyl)borate.

[Polymerization]

In the present invention, a catalyst for olefin polymerization prepared by contacting a compound (A) with a compound (B) and/or a compound (C) is used. In case of using a catalyst for olefin polymerization prepared by contacting the component (A) with the component (B), the above cyclic aluminoxane (B2) and/or linear aluminoxane (B3) are preferable as the component (B). Another preferable embodiment of the catalyst for olefin polymerization includes a catalyst for olefin polymerization prepared by contacting the above (A), (B) and (C), together As the component (B), the above (B1) is easily used.

The respective components are desirably used so that a molar ratio of (B)/(A) is usually within the range from 0.5 to 10000, preferably 5 to 2000 and a molar ratio of (C)/(A) is usually within the range from 0.01 to 100, preferably 0.5 to 10.

When the respective components are used in the state of a solution or state suspended in a solvent the concentration of the respective components is appropriately selected according to the conditions such as ability of an apparatus for feeding the respective components in a polymerization reactor. The respective components are desirably used so that the concentration of (A) is usually from 0.01 to 500 μmol/g, preferably from 0.05 to 100 μmol/g, more preferably from 0.05 to 50 μmol/g; the concentration of (B) is usually from 0.01 to 10000 μmol/g, preferably from 0.1 to 5000μmol/g, more preferably from 0.1 to 2000 μmol/g, in terms of Al atom; and the concentration of (C) is usually from 0.01 to 500 μmol/g, preferably from 0.05 to 200 μmol/g, more preferably from 0.05 to 100 μmol/g.

As the catalyst used in the present invention, an inorganic carrier such as $SiO_2$, $Al_2O_3$ or the like, and a particle-like carrier including an organic polymer carrier such as a polymer of ethylene, styrene or the like, etc. may be further used in combination.

In the present invention, the polymerization process has no restriction in particular, and any process such as, for example, a batch-wise or continuous gas phase polymerization process, bulk polymerization process, solution polymerization process or slurry polymerization process, or the like can be used. When a solvent is used, various kinds of solvents under a condition of not deactivating a catalyst can be used, and examples of such solvents include a hydrocarbon such as benzene, toluene, pentane, hexane, heptane, cyclohexane or the like; and a halogenated hydrocarbon such as methylene dichloride, dichlorostyrene or the like.

The polymerization temperature is not specifically limited, and a range of −100 to 250° C. is usually adopted and a range of −50 to 200° C. is preferably adopted. Further, the polymerization pressure is not specifically limited, but is carried out usually under a pressure of 10 MPa or less and preferably 0.2 MPa/cm$^2$ to 5 MPa. Further, a chain transfer agent such as hydrogen or the like can be added in order to adjust the molecular weight of the polymer.

The copolymer of the present invention can be used for molded articles such as films, sheets, pipes or containers or the like, and is particularly suitable for films, sheets or pipes.

The film, sheet or pipe is obtained, for example, by an inflation molding in which a melted resin is extruded from a circular die, an extruded film is inflated in a tubular shape and then it is wound up, by a T-die molding in which a melted resin is extruded from a linear T-die and an extruded filmor sheet iswoundup, by acalendering, by a blow molding, by an injection molding, by a profile extrusion molding or the like.

The molded article of the present invention has properties excellent in flexibility and elastic recoverability The flexibility and elastic recoverability can be investigated by obtaining a hysteresis curve according to tensile test.

The copolymer of the present invention can be also used in a form of a multi-layer film or sheet of 2 layers or more with other materials. The film or sheet can be produced by a known lamination process such as a co-extrusion process, a dry-lamination process, a sandwich-lamination process, an extrusion-lamination process or the like.

As other materials, there can be used known materials such as paper, paperboard, aluminum foil, cellophane, nylon, polyethylene telephthalate(PET), polypropylene, polyvinylidenechloride, ethylene-vinylalcohol copolymer (EVOH), various adhesive resins, or the like.

The molded article of the present invention can contain known additives such as antioxidants, weather resistant agents, lubricants, anti-static agents, anti-fogging agents, pigments and the like, according to requirements. Further, known polymer materials such as a low density polyethylene obtained by a radical polymerization process, a high density polyethylene, a linear low density polyethylene, an ethylene-α-olefin copolymer elastomer, polypropylene or the like may be blended.

The film or sheet of the present invention can be subjected to a known post-treatment such as a corona discharge treatment, a plasma treatment, an ozone treatment, an ultraviolet rays irradiation, an electron beam irradiation or the like.

EXAMPLE

The present invention is further illustrated in detail according to Examples below, but the present invention is not limited thereto. Further, properties of the polymers in Examples were measured according to methods described below.

(1) The intrinsic viscosity[η] was measured in tetralin at 135° C. using an Ubellohde viscometer.

(2) The glass transition point was measured under conditions below with a differential scanning caloriemeter (DSC) (SSC-5200 manufacture by Seiko Electronics Co., Ltd.) and determined by its inflection point.

Heating: 20° C. to 200° C. (20° C./min.), retention for 10 min.

Cooling: 200° C. to −50° C. (20° C./min.), retention for 10 min.

Measurement: −50° C. to 300° C. (20° C./min.)

(3) The molecular weight and molecular weight distribution were determined under conditions below with Gel Permeation Chromatograph (800 series manufacture by Nippon Bunko Co., Ltd.).

Column: Shodex A806M

Measurement temperature: 145° C.,

Measurement solvent: o-dichlorobenzene

Measurement concentration: 1 mg/ml (4) The content of styrene units in a copolymer and the structure of the copolymer were determined according to $^1$H-NMR and $^{13}$C-NMR analysis.

$^1$H-NMR (JNM-EX270 manufactured by JEOL LTD.)

Measurement solvent: dichloromethane-d2

Measurement temperature: room temperature $^{13}$C-NMR (AC250 manufactured by BRUKER LTD.)

Measurement solvent: a mixed liquid of o-dichlorobenzene and heavy benzene(mixed ratio; 85:15 (by weight).

Measurement temperature: 135° C.

(5) The solid viscoelasticity of a polymer was determined with a spectrometer (DMS200 of SDM5600 manufactured by Seiko Electronics Co., Ltd.) under conditions below.

Test piece: Press sheet of 20 mm×30 mm×0.3 mm

Frequency: 5 Hz

Speed of heating: 2° C./min.

Displacement of amplitude: 10 μm (6) The hysteresis curve of a polymer was determined under conditions below with STROGRAPH-T (manufactured by Toyo Seiki Seisakusho Co., Ltd.).

Test piece: Press sheet of 120 mm×20 mm×0.3 mm

Tensile rate: 200 mm/min.

Tensile magnification: Double

Distance between chucks: 60 mm (7) The refractive index of a polymer was determined by measuring a test piece which was obtained by cutting into a size of 10 mm×30 mm a film of 100 μm thickness molded by carrying out hot-press at 180° C. for 3 minutes under a pressure of 3 to 5 MPa after previously heating at 180° C. for 3 minutes, with an Abbe refractometer type 3 (manufactured by Atago Co., Ltd.).

(8) The total haze of the polymer was measured according to ASTM-D-1003 using a pressed sheet of 0.3 mm-thickness prepared by pressing for 5 minutes after pre-heating a polymer to 150° C. with a hot press machine, and then cooling the pressed sheet to 35° C. with a cooling press machine.

Example 1

After previously charging 11.4 ml of styrene, 20 ml of a toluene solution of norbornene(5 mol/l) and 105 ml of dry toluene into a 400 ml autoclave which had been replaced with argon, ethylene was charged at a pressure of 0.8 MPa. After a solution obtained by dissolving 15.5 mg of isopropylidene(cyclopentadienyl)(3-tert-buty.l-5-methyl-2-phenoxy)titanium dichloride in 15 ml of dry toluene and 2.5 ml of a toluene solution of triisobutylaluminum (manufactured by Toso-Akzo Co., Ltd., 1 mol/l) were previously mixed, they were charged therein and successively, a solution obtained by dissolving 80.1 mg of N,N-dimethylaniliniumtetrakis (pentafluorophenyl)borate in 47 ml of dry toluene was added. The reaction solution was stirred at 60° C. for 1 hour. Then, the reaction solution was poured in a mixture of 5 ml of hydrogen chloride (12N) and 1000 ml of acetone, and a precipitated white solid was obtained by filtration. The solid was washed with acetone and then dried under reduced pressure to obtain 26.85 g of a polymer. This polymer had an intrinsic viscosity [η] of 1.30 dl/g, a number average molecular weight of 154,000, a molecular weight distribution [weight average molecular weight(Mw)/number average molecular weight(Mn)] of 1.9, a glass transition point of 35° C., a norbornene content of 15 mol % and a styrene content of 16 mol %.

Figure 2:
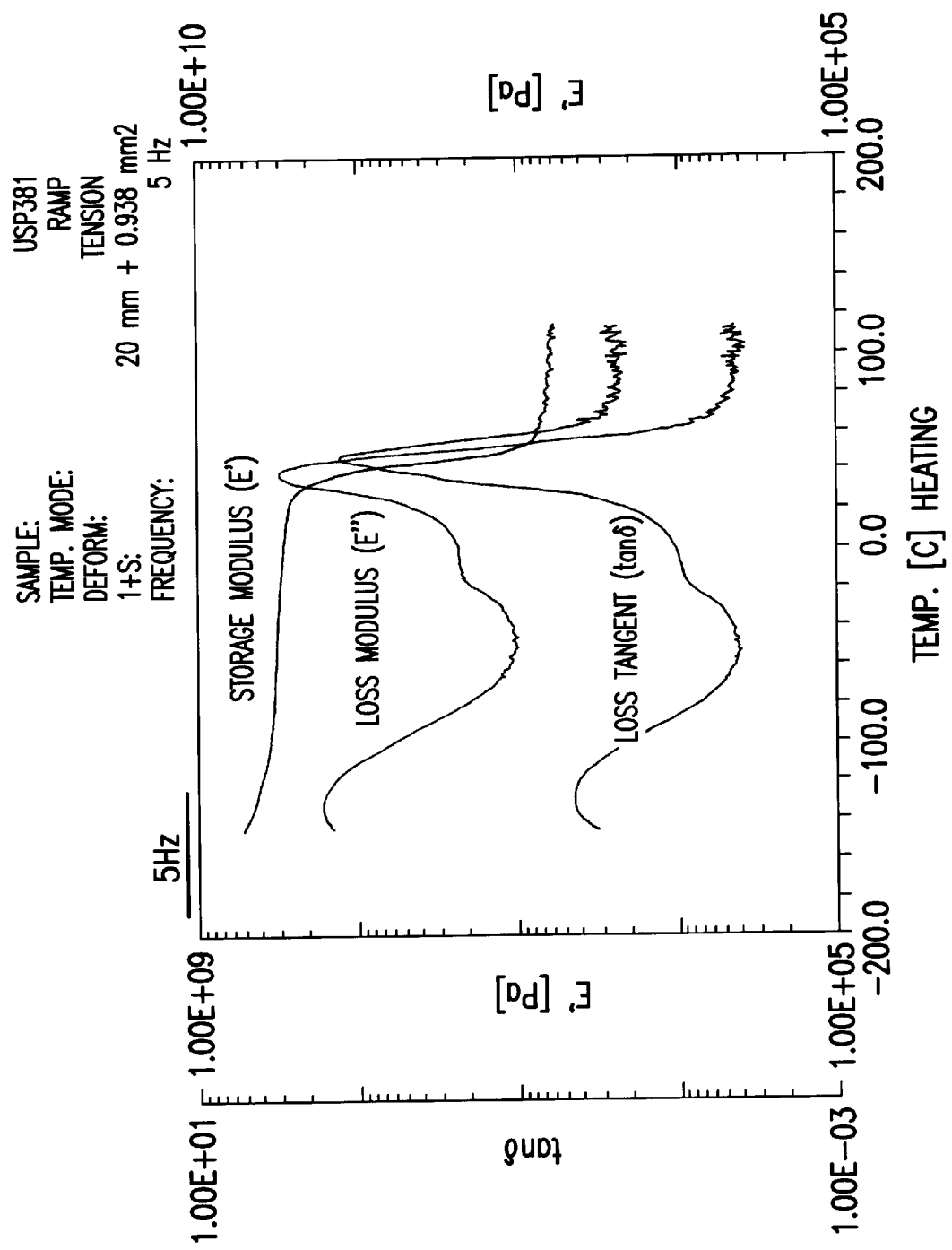
FIG. 2 shows data of the solid viscoelasticity of the copolymer obtained in Example 1.
Figure 3:
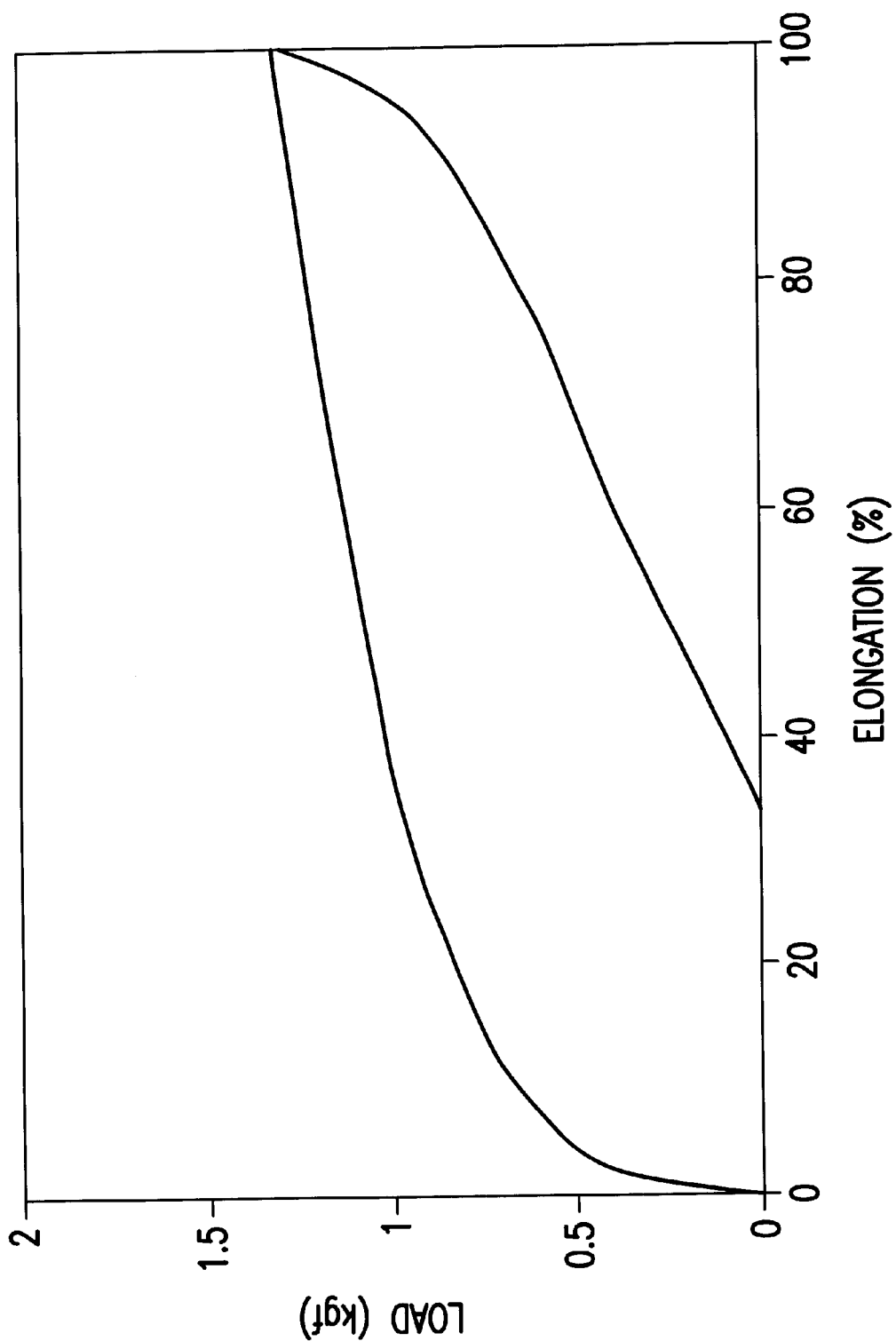
FIG. 3 shows a hysteresis curve of the copolymer obtained in Example 1.

The $^{13}$C-NMR spectrum, solid viscoelasticity data and hysteresis curve of the obtained polymer are shown in FIGS. 1, 2 and 3, respectively. After the measurement of the hysteresis curve, the test piece almost recovered to the condition before the measurement.

Besides, the press sheet prepared for measurement had a very high transparency.

Example 2

Figure 4:
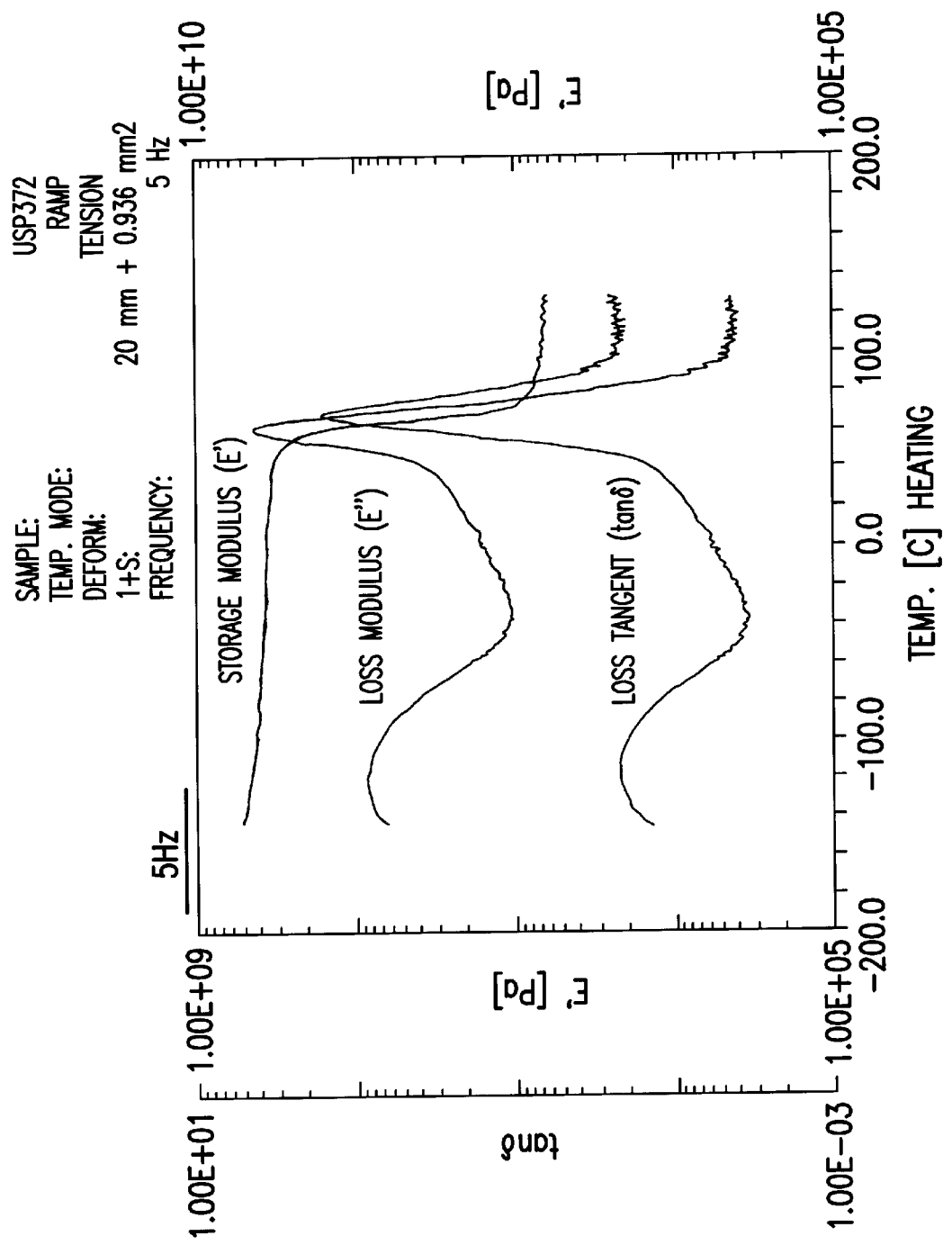
FIG. 4 shows data of the solid viscoelasticity of the copolymer obtained in Example 2.

After previously charging 114 ml of styrene, 20 ml of a toluene solution of norbornene(5 mol/l) and 6 ml of dry toluene into a 400 ml autoclave which had been replaced with argon, ethylene was charged at a pressure of 0.8 MPa. After a solution obtained by dissolving 11.6 mg of isopropylidene(cyclopentadienyl)(3-tert-butyl-5-methyl-2-phenoxy)titanium dichloride in 12 ml of dry toluene and 3.0 ml of a toluene solution of triisobutylaluminum [manufactured by Toso-Akzo Co., Ltd., 1 mol/l] were previously mixed, they were charged therein and successively, a solution obtained by dissolving 72.0 mg of N,N-dimethylaniliniumtetrakis (pentafluorophenyl)borate in 45 ml of dry toluene was added. The reaction solution was stirred at 60° C. for 1 hour. Then, the reaction solution was poured in a mixture of 5 ml of hydrogen chloride (12N) and 1000 ml of acetone, and a precipitated white solid was obtained by filtration. The solid was washed with acetone and then dried under reduced pressure to obtain 18.34 g of a polymer. This polymer had an intrinsic viscosity $[\eta]$ of 1.25 dl/g, a number average molecular weight of 162,000, a molecular weight distribution [weight average molecular weight(Mw)/number average molecular weight(Mn)] of 2.0, a glass transition point of 55° C., a norbornene content of 15 mol % and a styrene content of 36 mol %. The solid viscoelasticity of the obtained polymer is shown in FIG. 4. Further, the obtained polymer had a total haze of 11.8% and a refractive index of 1.57.

Example 3

After previously charging 27 ml of styrene, 48 ml of atoluene solution of norbornene(5 mol/l) and 13 ml of dry toluene into a 400 ml autoclave which had been replaced with argon, ethylene was charged at a pressure of 0.8 MPa. After a solution obtained by dissolving 3.0 mg of isopropylidene(cyclopentadienyl)(3-tert-butyl-5-methyl-2-phenoxy)titanium dichloride in 6 ml of dry toluene and 2.0 ml of a toluene solution of triisobutylaluminum [manufactured by Toso-Akzo Co., Ltd., 1 mol/l] were previously mixed, they were charged therein and successively, a solution obtained by dissolving 19.2 mg of N,N-dimethylaniliniumtetrakis (pentafluorophenyl)borate in 24 ml of dry toluene was added. The reaction solution was stirred at 60° C. for 1 hour. Then, the reaction solution was poured in a mixture of 2 ml of hydrogen chloride (12N) and 500 ml of acetone, and a precipitated white solid was obtained by filtration. The solid was washed with acetone and then dried under reduced pressure to obtain 1.43 g of apolymer. This polymer had a glass transition point of 123° C., a norbornene content of 28 mol % and a styrene content of 19 mol %.

Example 4

After previously charging 114 ml of styrene, 4 ml of a toluene solution of norbornene(5 mol/l) and 34 ml of dry toluene into a 400 ml autoclave which had been replaced with argon, ethylene was charged at a pressure of 0.8 MPa. After a solution obtained by dissolving 15.5 mg of isopropylidene(cyclopentadienyl)(3-tert-butyl-5-methyl-2-phenoxy)titanium dichloride in 15 ml of dry toluene and 3.0 ml of a toluene solution of triisobutylaluminum [manufactured by Toso-Akzo Co., Ltd., 1 mol/l] were previously mixed, they were charged therein and successively, a solution obtained by dissolving 96.1 mg of N,N-dimethylaniliniumtetrakis (pentafluorophenyl)borate in 30 ml of dry toluene was added. The reaction solution was stirred at 60° C. for 2 hour. Then, the reaction solution was poured in a mixture of 5 ml of hydrogen chloride (12N) and 1000 ml of acetone, and a precipitated white solid was obtained by filtration. The solid was washed with acetone and then dried under reduced pressure to obtain 28.04 g of a polymer. This polymer had a glass transition point of 39° C., a norbornene content of 3 mol % and a styrene content of 48 mol %.

Example 5

After previously charging 114 ml of styrene, 40 ml of a toluene solution of norbornene(5 mol/l) and 34 ml of dry toluene into a 400 ml autoclave which had been replaced with argon, ethylene was charged at a pressure of 0.8 MPa. After a solution obtained by dissolving 15.5 mg of isopropylidene(cyclopentadienyl)(3-tert-butyl-5-methyl-2-phenoxy)titanium dichloride in 15 ml of dry toluene and 3.0 ml of a toluene solution of triisobutylaluminum [manufactured by Toso-Akzo Co., Ltd., 1 mol/l] were previously mixed, they were charged therein and successively, a solution obtained by dissolving 96.1 mg of N,N-dimethylaniliniuntetrakis (pentafluorophenyl)borate in 30 ml of dry toluene was added. The reaction solution was stirred at 60° C. for 2 hour Then, the reaction solution was poured in a mixture of 5 ml of hydrogen chloride (12N) and 1000 ml of acetone, and a precipitated white solid was obtained by filtration. The solid was washed with acetone and then dried under reduced pressure to obtain 34.86 g of a polymer. This polymer had a glass transition point of 83° C., a norbornene content of 21 mol % and a styrene content of 46 mol %.

As described above, according to the present invention, there is provided a transparent polymer being excellent in flexibility, heat resistance and oil resistance, and able to take a constitution not containing a halogen which may be questioned from the viewpoint of environmental pollution.

Further, there is provided a process for producing said polymer at extremely high polymerization activity, and a transparent molded article excellent in flexibility, heat resistance and oil resistance made from said polymer, and its utility value is markedly large.

What is claimed is:

1. A copolymer of (a) ethylene and/or an α-olefin, (b) a cyclic olefin selected from the group consisting of monocyclic olefins in which 4 or more of carbon atoms which optionally have a substituent group, form a ring and one carbon-carbon double bond is contained in said ring and poly-cyclic olefins represented by the general formula (IV) described below:

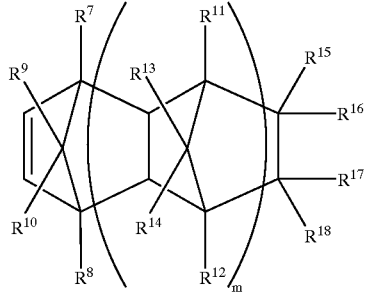

(IV)

wherein each of $R^7$ to $R^{18}$ independently is a hydrogen atom, a hydroxyl group, an amino group, a phosphino group or an organic group having 1 to 20 carbon atoms, and $R^{16}$ and $R^{17}$ may form a ring; and "m" indicates an integer of 0 or more, and (c) an alkenyl aromatic hydrocarbon, said copolymer having a cyclic olefin content of 0.01 to 66 mol % and an alkenyl aromatic hydrocarbon content of 3 to 99 mol %, and wherein the alkenyl aromatic hydrocarbon content is more than a half of the cyclic olefin content and the total content of ethylene and/or an α-olefin, cyclic olefin and alkenyl aromatic hydrocarbon are 100 mol % of the copolymer.

2. The copolymer according to claim 1, wherein the alkenyl aromatic hydrocarbon content is not less than the cyclic olefin content.

3. The copolymer according to claim 1, wherein the copolymer has no crystallinity.

4. The copolymer according to claim 1, wherein the copolymer has a glass transition point of −20 to 140° C.

5. The copolymer according to claim 3, wherein the copolymer has a glass transition point of −20 to 140° C.

6. The copolymer according to claim 4, wherein the copolymer has a glass transition point of 35° C. or more and less than 60° C.

7. A process for producing a copolymer of (a) ethylene and/or an α-olefin, (b) a cyclic olefin and (c) an alkenyl aromatic hydrocarbon, said copolymer having a cyclic olefin content of 0.01 to 66 mol % and an alkenyl aromatic hydrocarbon content of 3 to 99 mol %, and wherein the alkenyl aromatic hydrocarbon content is more than a half of the cyclic olefin content and the total content of ethylene and/or an α-olefin, cyclic olefin and alkenyl aromatic hydrocarbon are 100 mol % of the copolymer wherein the process comprises copolymerizing ethylene and/or an α-olefin with a cyclic olefin and an alkenyl aromatic hydrocarbon in the presence of a catalyst prepared from [i] (A) and (B); [ii] (A) and (C); or [iii] (A), (B) and (C) described below:

(A): a transition metal complex represented by the following general formula [I], [II] or [III]:

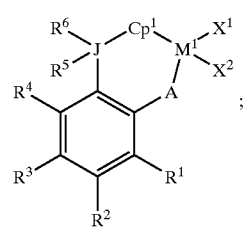

[I]

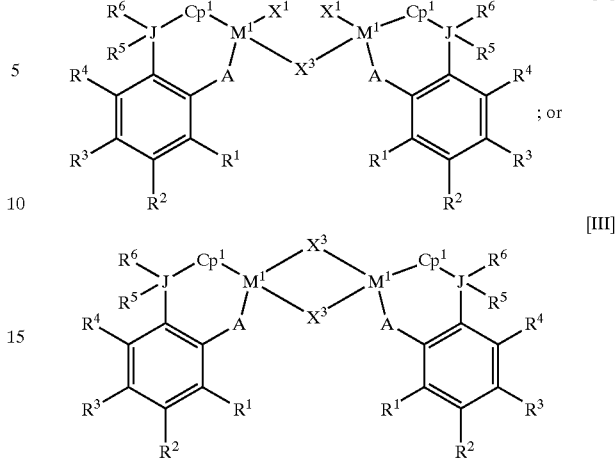

wherein $M^1$ indicates a transition metal atom of the Group IV of the Periodic Table of the Elements, A indicates an atom of the Group XVI of the Periodic Table of the Elements, J indicates an atom of the Group XIV of the Periodic Table of the Elements, $Cp^1$ indicates a group having a cyclopentadiene type anion skeleton, each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group, $X^3$ indicates an atom of Group XVI of the Periodic Table of the Elements, $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different;

(B) one or more aluminum compounds selected from a group consisting of the following (B1) to (B3):

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$, wherein $E^1$, $E^2$, and $E^3$ respectively represent a hydrocarbon group, all of $E^1$, all of $E^2$ and all of $E^3$ may be the same or different, Z represents a hydrogen atom or a halogen atom, and all of Z may be the same or different, "a" represents a number satisfying the expression $0 < a \leq 3$, "b" represents an integer of 2 or more and "c" represents an integer of 1 or more; and (C) a boron compound of any one of the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$, wherein B represents a boron atom in the trivalent valence state, $Q^1$ to $Q^4$ may be the same or different and respectively represent a halogen atom, a hydrocarbon group, a halogenated hydrocarbon group, a substituted silyl group, an alkoxy group or a di-substituted amino group, $G^+$ represents an inorganic or organic cation, L represents a neutral Lewis base, and $(L-H)^+$ represents a Brønsted acid.

8. A molded article comprising the copolymer of claim 1.

9. A molded article comprising the copolymer of claim 2.

10. A molded article comprising the copolymer of claim 3.

11. A molded article comprising the copolymer of claim 4.

12. A molded article comprising the copolymer of claim 5.

13. A molded article comprising the copolymer of claim 6.

14. The copolymer according to claim 1, wherein the cyclic olefin content is 1 to 30 mol %.

15. The copolymer according to claim 1, wherein the alkenyl aromatic hydrocarbon content is 5 to 45 mol %.

16. The copolymer according to claim 14, wherein the alkenyl aromatic hydrocarbon content is 5 to 45 mol %.

17. The copolymer according to claim 14, wherein the copolymer has a glass transition point of 35° C. or more and less than 60° C.

18. The copolymer according to claim 15, wherein the copolymer has a glass transition point of 35° C. or more and less than 60° C.

19. The copolymer according to claim 16, wherein the copolymer has a glass transition point of 35° C. or more and less than 60° C.

20. The copolymer according to claim 1, wherein the organic group having 1 to 20 carbon atoms is a group selected from the group consisting of alkyl groups, aryl groups, aralkyl groups, alkoxy groups, acyl groups, alkoxycarbonyl groups; aryloxycarbonyl groups, aralkyloxycarbonyl groups, acyloxy groups, alkoxysulfonyl groups, aryloxysulfonyl groups, aralkyloxysulfonyl groups, substituted silyl groups, dialkylamino groups, a carboxyl group, a cyano group and a group in which a part of hydrogen atoms of the above-mentioend alkyl groups, aryl groups or aralkyl groups is substituted with a hydroxyl group, an amino group, an acyl group, a carboxyl group, an alkoxy group, an alkoxycarbonyl group, an acyloxy group, a substituted silyl group, an alkylamino group or a cyano group.

21. The copolymer according to claim 1, wherein the cyclic olefin is a member selected from the group consisting of cyclobutene, cyclopentene, cyclohexene, cyclooctene, 3-methylcyclopentene, 4-methylcyclopentene, 3-methylcyclohexene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, 8-cyanotetracyclododecene and 1,2-dihydrodicyclopentadiene.

22. The copolymer according to claim 20, wherein the alkenyl aromatic hydrocarbon content is not less than the cyclic olefin content.

23. The copolymer according to claim 20, wherein the copolymer has no crystallinity.

24. The copolymer according to claim 20, wherein the copolymer has a glass transition point of −20 to 140° C.

25. The copolymer according to claim 23, wherein the copolymer has a glass transition point of 35° C. or more and less than 60° C.

26. A molded article comprising the copolymer of claim 20.

27. A molded article comprising the copolymer of claim 21.

* * * * *